July 14, 1959     F. E. HUTCHISON     2,895,039
DERRICK GIRTH LIGHT
Filed Sept. 9, 1955
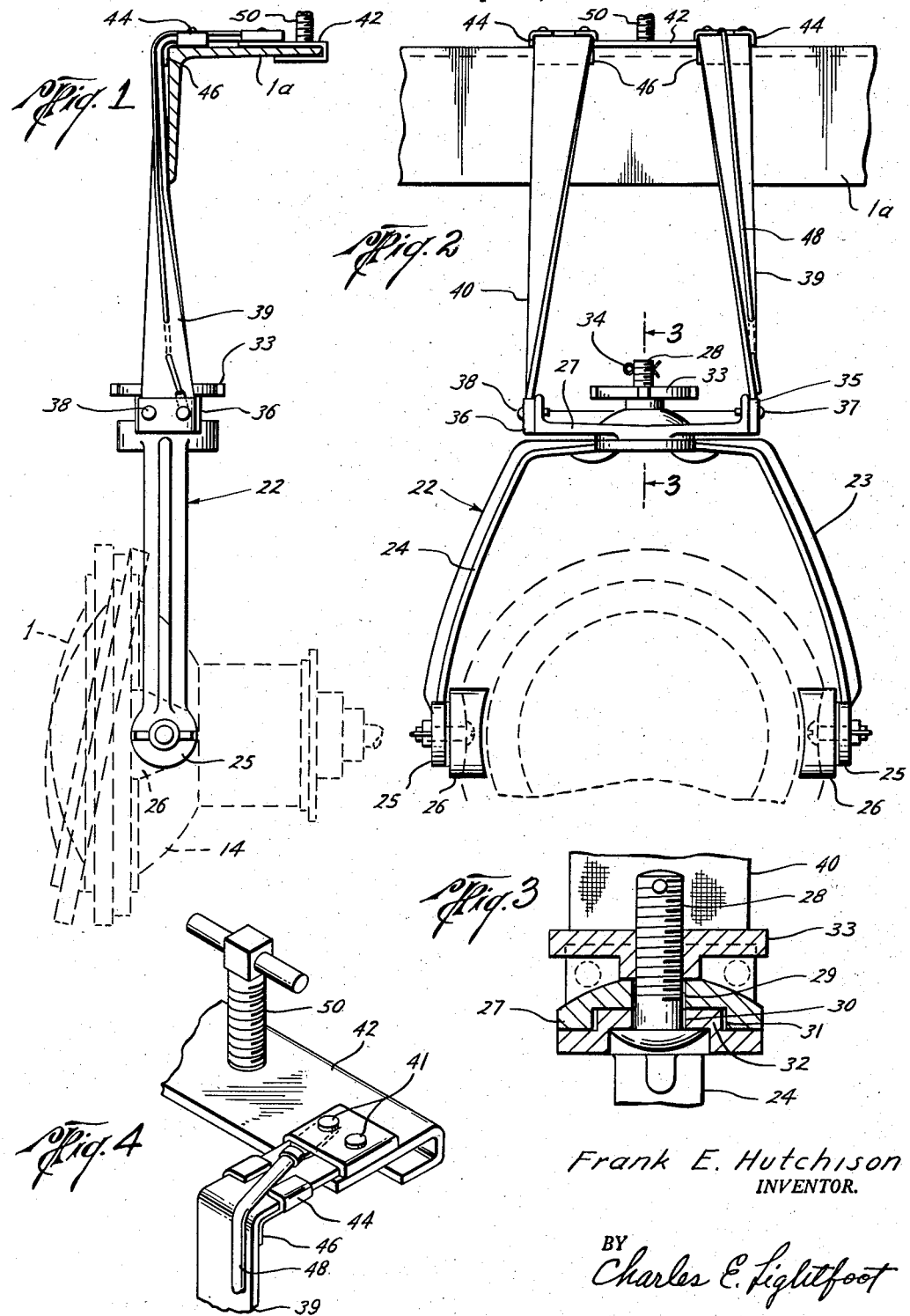
Frank E. Hutchison
INVENTOR.
BY
Charles E. Lightfoot
ATTORNEY

United States Patent Office 2,895,039
Patented July 14, 1959

2,895,039

DERRICK GIRTH LIGHT

Frank E. Hutchison, Houston, Tex.

Application September 9, 1955, Serial No. 533,332

1 Claim. (Cl. 240—90)

This invention relates to improvements in a derrick light or the like.

This application is a continuation-in-part of a prior application Serial No. 180,530, filed by the same applicant on August 21, 1950 and which has become abandoned.

An object is to provide novel hanger means for suspending the derrick light or the like from the transverse angle irons of a derrick which is subject to frequent jarring and vibrations, such novel hanger having flexible suspension means to prevent it from being dislodged from its connection with the angle iron of the derrick and also adjustable vertical and horizontal pivotal means.

A further object of the invention is the provision of a derrick light having metal parts and flexible suspension means by which the same may be suspended from a transverse metallic member or a derrick, and which also embodies means for forming an electrical grounding connection between the metal parts of the light and the member whereby non-conducting material may be safely employed for the flexible suspension means.

Other objects and advantages of this invention will become apparent from the following description taken in connection with the accompanying drawings, wherein is set forth by way of example and illustration one embodiment of the invention. It is to be understood that the drawings and description are not to be taken by way of limitation and that the scope of the invention is to be limited only by the prior art and by the terms of the appended claim.

In the drawings:

Figure 1 is a side elevational view illustrating the invention and showing the hanger or flexible suspension means as connected to the front and rear ends of the angle iron;

Figure 2 is a front elevational view of the hanger or suspension means;

Figure 3 is a cross-sectional view taken on lines 3—3 of Figure 2; and

Figure 4 is a fragmentary perspective view illustrating details of construction of the holding member or clamp by which the suspension means is attached to the derrick and showing the manner in which the electrical grounding connection is established.

Referring now more in detail to the drawings the numeral 1 designates the hollow casing of a derrick light adapted to be suspended from an angle iron 1a forming a horizontally disposed portion of the framework of a derrick, or the like.

The light casing 1 is of a type having a convex back 14 forming a light chamber within which an electric lamp is disposed and provided with external lugs or ears 26 by which the casing is adapted to be suspended from the derrick in the manner hereinafter set forth.

The derrick light is adapted to be suspended from the derrick angle iron 1a by a bracket or yoke member 22, whose arcuate arms 23 and 24 are formed, at their ends, with side bearings 25, 25 that may be pivotally or rotatably secured to the ears 26, 26 on the casing of the light, as shown in Figures 1 and 2.

The upper or central portion of the member 22 may be bent inwardly to form a flat, horizontal surface. The cross-bar 27 may be rotatably mounted on the flat surface of the member 22 by the bolt 28 whose free end is passed upwardly through the vertically aligned openings 29 and 30 in bearings in the intermediate portions of the bracket member and cross-bar, such bearings being provided by the annular groove 31 in the under side of the cross-bar to receive rotatably the annular, raised portion 32 on the flat surface of the bracket member 22. The nut 33 is threaded on the free end of the bolt 28 to hold the bracket and cross-arm assembly in any desired horizontal position with respect to the derrick angle iron, and the cotter key 34 may be inserted in a bore in the upper end of the bolt 28 to prevent the nut 33 from becoming unscrewed and lost.

The ends 35 and 36, respectively, of the cross-arm are turned upwardly at right angles to form end flanges to receive the screws 37 and 38, respectively, or other suitable fastenings, which are provided to securely hold the lower ends of the impregnated belts 39 and 40 to the respective ends of said cross-arm. The upper or opposite ends of said belts are secured by rivets 41 to the respective, front side portions of the holding member or clamp 42, whose rear end is bent downwardly and forwardly at respective right angles to snugly fit around the rear end portion of the horizontal flange of the angle iron. Clips, such as those indicated at 44, may be disposed on the belts 39 and 40 for sliding movement thereon, these clips having downturned portions 46 beneath the belts which fit snugly against the front, marginal edge of the vertical flange of the derrick.

The belts 39 and 40 may be formed of electrically non-conductive material and are twisted mediate their ends, as shown in Figures 1 and 2, so that the upper end portions of the belts lie in planes parallel to the longitudinal axis of the angle-iron support 1a, while the lower end portions of the belts lie in planes at right angles to such axis. By so twisting the belts and attaching them to the support and crossbar, the belts serve to flexibly support the light and prevent the transmission of jarring and vibration from the support to the light.

An electrical conductor, such as a wire 48 may be threaded through one of the flexible suspension belts, as the belt 39, and connected at one end to the screw 37 of the cross-arm end 35, and at its other end to one of the rivets 41, whereby an electrical connection is established between the framework of the light and the clamp 42. Suitable means, such as the screw 50 may be threadably carried by the clamp 42 which is engageable with the angle iron 1a to securely hold the clamp against displacement on the angle iron and to assure an electrical ground connection between the clamp and the derrick.

In operation, the derrick light fixture may be suspended from the derrick angle iron without danger of it working loose from any direction, and at the same time its adjustment, either vertically or horizontally, may be accomplished by a manipulation of the pivotal means above described.

By the provision of the electrical grounding connection between the light and the derrick it will be apparent that non-conducting materials may safely be used in the belts 39 and 40.

While the invention is disclosed in connection with certain specific embodiments, it will be understood that the same are intended to be illustrative only, and numerous changes can be made in the structure and arrangement of the parts without departing from the spirit of the invention or the scope of the appended claim.

Having thus clearly shown and described the invention, what is claimed as new and desired to secure by Letters Patent is:

The combination with a light carrying body formed of metal, a yoke having spaced vertically-disposed depending arms at opposite sides of the body, means connecting the arms to the body for vertical angular adjustment of the body in the yoke, a horizontally disposed crossbar and means connecting the crossbar to the yoke mediate the ends of the crossbar for horizontal angular adjustment of the yoke on the crossbar, of spaced apart, flat, vertically elongated flexible members of electrically nonconductive material attached at their upper ends to an elongated horizontal metallic support at longitudinally spaced locations on the support and at their lower ends to the ends of the crossbar, the upper end portions of said members lying in planes parallel to the longitudinal axis of said support and the lower end portions of said members lying in planes at right angles to said axis and means forming an electrical connection between the body and said support.

References Cited in the file of this patent

UNITED STATES PATENTS

| | | |
|---|---|---|
| 1,144,593 | Heiser | June 29, 1915 |
| 1,184,097 | Hobson | May 23, 1916 |
| 1,435,763 | Townsend | Nov. 14, 1922 |
| 1,584,369 | Graham | May 11, 1926 |
| 1,784,539 | Ricker | Dec. 9, 1930 |
| 1,802,589 | Thompson | Apr. 28, 1931 |
| 1,915,967 | Bailey | June 27, 1933 |
| 2,073,074 | Sauer | Mar. 9, 1937 |
| 2,224,225 | Holroyd | Dec. 10, 1940 |
| 2,347,055 | Johnson | Apr. 18, 1944 |